Sept. 28, 1965　　　　J. F. BLUMRICH　　　3,208,707
PIVOTAL SHOCK ABSORBING PAD ASSEMBLY
Original Filed April 14, 1964　　　　2 Sheets-Sheet 1

INVENTOR.
JOSEF F. BLUMRICH
BY
ATTORNEYS

Sept. 28, 1965  J. F. BLUMRICH  3,208,707
PIVOTAL SHOCK ABSORBING PAD ASSEMBLY
Original Filed April 14, 1964  2 Sheets-Sheet 2

INVENTOR.
JOSEF F. BLUMRICH
ATTORNEYS

United States Patent Office 3,208,707
Patented Sept. 28, 1965

3,208,707
PIVOTAL SHOCK ABSORBING PAD ASSEMBLY
Josef F. Blumrich, Huntsville, Ala., assignor to the United States of America as represented by the Administrator of the National Aeronautics and Space Administration
Original application Apr. 14, 1964, Ser. No. 360,182, now Patent No. 3,175,789, dated Mar. 30, 1965. Divided and this application Dec. 8, 1964, Ser. No. 416,941
6 Claims. (Cl. 248—188.9)
(Granted under Title 35, U.S. Code (1952), sec. 266)

The invention described herein may be manufactured and used by or for the Government of the United States of America for governmental purposes without the payment of any royalties thereon or therefor.

This application is a division of copending application Serial No. 360,182, filed April 14, 1964, now Patent No. 3,175,789.

The invention relates in general to a pad assembly and more particularly to a pivotal shock absorbing assembly for use as the touch-down and load distributing portion in the landing gear systems of aerospace vehicles.

As is to be expected, all space vehicles that are to soft land on a celestial body must be equipped with some type of landing gear system for not only absorbing the rather severe touch-down shock to be encountered, but also for maintaining the vehicle in a substantially upright or other predesigned operating position. Although the touchdown velocity of a given space vehicle can be reasonably accurately predicted, the exact type and amount of shock that a landing gear system must be capable of absorbing is difficult to ascertain primarily because there is no way of knowing with any degree of certainty the type of landing surface that will be encountered. This is especially true where the landing surface is a celestial body such as, for example, the lunar surface. Therefore, since so little is known about various celestial bodies upon which space vehicles will be landing, and in view of the numerous types of surfaces that may be encountered on such bodies, every component of a landing gear system must be designed to operate properly on any surface and absorb a maximum amount of abuse without a failure occurring.

In the absence of any concrete evidence as to the type of strata or terrain which is to be found on a celestial body such as, for example, the lunar surface, certain basic "ground rules" have been established for calculating the particular landing gear system that would best support a space vehicle. Among these is that the vehicle landing gear system must be capable of withstanding a vertical touch-down velocity of at least 6 m./sec. and must not topple if it lands on a slope of up to 30 degrees or strikes a solid object with a horizontal drift velocity of 1 m./sec.

According to the above stated rules, as well as certain other gear design data, it was determined that a landing gear system designed to extend substantially straight down from a space vehicle would not prevent the vehicle from overturning if it landed on a slope approaching 30 degrees in tilt. Since an overturn of the vehicle would in all probability be disastrous, it was imperative that the landing gear system extend or reach out beyond the diameter of the vehicle stage itself to such an extent as to assure stability of the vehicle. The extent to which the landing gear system can be extended is limited, however, by several factors including vehicle ground clearance, weight, storage of the system, etc. The optimum "spreading" of the landing gear system, taking all of these factors into consideration, was found to be somewhat more than twice the diameter of the vehicle. This limited extension of the landing gear system created considerable problems regarding landing gear concepts, functions and system design that have heretofore been of little concern to those involved with the design of conventional type landing gear systems.

To a certain extent there is a great similarity in the problems that were encountered in the development of a landing gear system for a lunar landing vehicle and that of a large launch booster. That is, a number of concepts that have proven to be entirely feasible for small structures could not be used on their large counterparts. This particular case has been found to be especially true of the landing gear shock absorbers and landing pads to be used on space vehicles of the 10,000 lbs. or above category. For example, the use of compressible foam landing pads is presently favored for small landing stages. If if is considered, however, that the landing of a space craft weighing over 5 tons will require that the shock absorber have more than one foot stroke at a minimum for a soft landing on the lunar surface, and even more if lower decelerations turn out to render better overall results, it is seen that a combination foam shock absorber and landing pad which is crushed upon initial impact with the lunar surface is definitely not desirable. Besides these functional points of concern, the storage of such bulky shock absorbers and pads either inside or outside the vehicle contour is presently not feasible.

According to the present invention it has been found that by using separate landing pads and shock absorbers so that each element can operate under and be designed for its specific requirements the shortcomings of prior landing gear systems can be substantially eliminated. This approach permits the landing pad as well as the shock absorber to be treated and studied as a separate element of the landing gear system without having to include in its design those considerations regarding energy dissipation per se.

Since the landing pad is the structure that is to come into direct and intimate contact with the surface upon which the space vehicle is to land it is imperative that it be capable of successfully withstanding the wide variation of loads and surface conditions that may possibly be encountered. As mentioned hereinabove, while the loads to be encountered in most launching operations can be reasonably well predicted, the surface conditions are practically unknown. Thus it becomes mandatory that the landing pad be constructed so that it will perform its intended function regardless of whether the landing occurs on hard rock, on a material that will only withstand a relatively low pressure or any range therebetween. Furthermore, the landing pad must also withstand those lateral impacts which will result if the pad slides on the landing surface and impacts against a hard abutment.

According to the present invention it has been found that a landing pad which is capable of functioning properly upon substantially all landing surfaces and yet is particularly well adapted for use on celestial exploratory vehicles can be produced by using a hollow spherical curved pad having radially collapsible ribs or spokes formed therein. These ribs are designed to absorb by collapsing or crumpling a substantial amount of any lateral shock applied to the edge of the pad thereby relieving the stress that would otherwise normally be transmitted either to the shock absorber of the landing gear system or the vehicle itself. The use of a ball joint, which is located as close to the bottom of the pad as possible, for securing the pad to the landing gear system assures that the pad will always present a positive angle of attack to the landing surface as it slides therealong. To assure that a proper frictional force is always presented to the pad regardless of the makeup of the landing surface over which it is sliding, the bottom or underside of the landing pad is covered with a layer of material that will shear off at certain frictional forces.

Therefore, the primary object of this invention is to provide a landing pad which is particularly adapted for use as a part of a landing gear system on a space vehicle.

Another object of this invention is to provide a landing pad for a space vehicle landing gear system that is extremely light, inexpensive to produce, highly reliable and will absorb lateral shock.

Yet another object of this invention is to provide a landing pad for a space vehicle landing gear system that will not only withstand high impact forces but will maintain the proper angle of attack while sliding over various surfaces.

Yet another object of this invention is to provide a landing pad for a space vehicle landing gear system which maintains a predetermined frictional force as it slides over different or various type surfaces.

These and further objects and advantages of this invention will be more apparent upon reference to the following specification, appended claims and drawing wherein:

Figure 1:
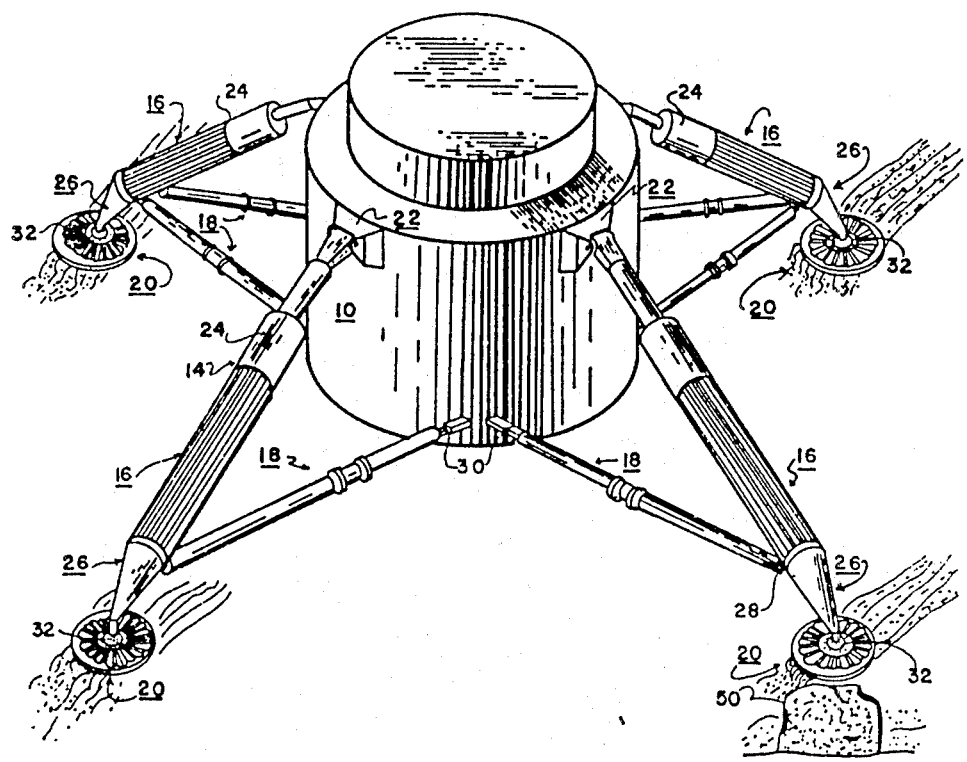
FIGURE 1 is a pictorial view of a space vehicle, which is equipped with a landing gear system having landing pads constructed in accordance with this invention, as it touches down on a celestial body.

With continued reference to the accompanying figures wherein like numerals designate similar parts throughout the various views, and with initial attention directed to FIGURE 1, reference numeral 10 designates a space vehicle which has just successfully negotiated a landing on the surface 12 of a celestial body. In order to cushion the shock that would otherwise be produced as the space vehicle 10 touched down on the surface of the celestial body, a landing gear system 14 of the extended arm type is provided on the vehicle. This landing gear system consists essentially of three different components. Namely, the main struts 16, the lower struts 18, and the landing pads 20.

The main struts 16, which are connected at their upper end to the main load ring (not shown) of the vehicle through pivot joints 22, are employed for carrying the main landing load from the landing pads 20 to the space vehicle 10. These main struts are also the only members available for transmitting the torque that occurs due to load components perpendicular to the vertical plane of the landing gear system 14. To absorb these various landing loads, shock absorbers 24 of telescoping type are located on the main struts 16. The lower telescoping struts 18 are connected to the knees 26 of the main struts 16 by pin means 28 and to the lower ring frame (not shown) of the vehicle 10 through pivotable pin means 30. These struts may also be provided with shock absorbers which are, however, built within the struts and are not visible from the outside. Each of the landing pads 20 are connected to the lower end of the main strut 16 by means of a ball joint 32 in a manner that will be more fully set forth hereinafter.

Figure 2:
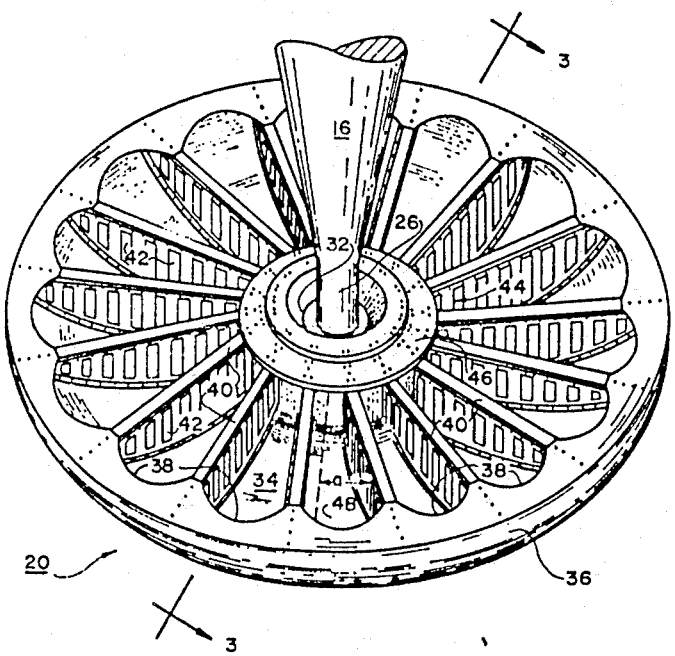
FIGURE 2 is an enlarged view of one of the landing pads seen in FIGURE 1.

As mentioned hereinabove, the landing pads 20 are designed to directly contact the surface 12 and must, therefore, be capable of supporting the space vehicle 10 regardless of the type surface encountered. FIGURE 2 illustrates the construction of such a pad. As seen in FIGURE 2, the landing pad 20 consists of a bowl-shaped outer surface 34 having a generally spherical, elliptical or other smoothly curved configuration formed from a relatively thin sheet of material such as aluminum. The rim or edge 36 of the outer surface 34 is turned over to form flanges 38 to which are attached by any suitable method, such as by welding or riveting, one end of a plurality of ribs or spokes 40. These ribs 40 have a cross sectional configuration closely resembling a U and are curved along their lower edge so as to conform with the curved inner surface of the bowl-shaped surface 34. Each rib 40 is also provided with indents or corrugations 42 for strengthening the ribs and thus the entire landing pad against buckling or otherwise collapsing in a direction parallel to the axis of the ball joint 32. A center hub 44, which is provided with a flanged lip 46 into which the other end of the ribs 40 are attached, is provided at the center of the landing pad 20. As mentioned hereinabove, and for purposes that will be more fully explained hereinafter, a ball joint 32 is used to secure the landing pad to the lower end of the main strut 16.

From the construction of the pads 20 it can be seen that if the space vehicle descends upon a hard surface, such as a rock formation on the surface 12, then the center hub 44 will support the weight of the vehicle. On the other hand, should a relatively soft surface be encountered upon touch-down of the vehicle the full underside of the pad 20 will be required to support the space vehicle. Thus the pad must be so designed and constructed as to withstand a high load in a vertical direction without buckling or otherwise failing.

Equally important in the design of a pad to be used where soft landing surfaces may be encountered is how to cope with any sliding of the pad that might occur. A landing on such a soft surface would, in all probability, result in some sliding of the pads if the space vehicle did not descend in a perfectly vertical direction or if the surface upon which the landing occurred where sloped to any appreciable degree. Since the landing gear struts 16 and 18 do not have the capability of absorbing any shocks occurring when the landing pads 20 slide against an abutment, such as the rocklike surface 50 shown in FIGURE 1, it is necessary to provide such a capability in the landing pads themselves. Obviously shock for the pad 20 itself comes in a radial direction. Thus the size and construction of the radial ribs must be designed so that they will carry the vertical load placed thereon due to the pressure on their underside, but will fail under the proper radial loads thereby providing the energy absorption needed.

This controlled collapse of the pads 20 in a radial direction upon engaging a solid abutment is accomplished in part by positioning the ribs 40 so that they do not extend radially outward from the center hub 44 as would be the case if they followed the broken line 48, but are angled therefrom by an amount designated as "a." This arrangement permits the rib to not only crumple or collapse radially inwardly but to also bend in a counterclockwise direction when subjected to a predetermined radial load.

Figure 3:
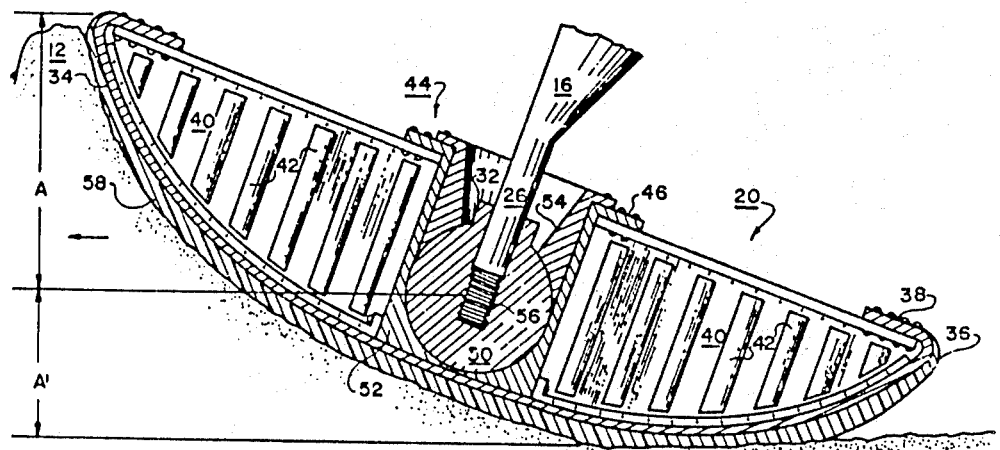
FIGURE 3 is a cross sectional view of the landing pad of a space vehicle seen in FIGURE 2 which illustrates the construction of the pad that permits it to absorb radial shock and to maintain a correct angle of attack as well as a predetermined coefficient of friction as it slides over various surfaces.

Another problem that is encountered during the sliding of a landing pad over a soft surface is the tendency for the pad to "dig-in" or cut into the surface thereby causing the pad to no longer function properly. This tendency to dig-in has been completely elminated in the present landing pads 20 by using a ball joint for coupling the pads to the struts 16 which is located as close to the underside of the pad as is possible. FIGURE 3, which is an enlarged cross-section taken across the landing pad of the space vehicle 10 shown in FIGURE 2, shows the location and construction of such a ball joint. As can be seen in this figure, the ball 50 is held within the socket 52 by a retainer ring or sleeve 54 while the knee 26 of the main strut 16 is secured within the ball by any suitable means. This arrangement permits complete freedom of movement of the pad 20 about the ball joint with the only limitation thereon being the engagement of the knee 26 with the sleeve wall 54.

Since the center of pivot point 56 of the ball 50 is located as nearly as possible to the underside of the landing pad 20, the area A, which represents the surface of the pad that is above the pivot point will always be greater than are A1 found below the pivot point. This plus the resultant force of the vertical and frictional load will result in an eccentric load being applied to the pad as the pad slides over a surface in the direction of the arrowhead and the surface material 12 building up in the front of the pad. The line or resultant force of this eccentric load will always pass above the center 56 of the ball joint 36 thereby causing it to pivot into a positive angle of attack. The landing pad will, therefore, always have the tendency to slide or skip over obstacles rather than to dig into the surface 12. In a similar manner, a horizontal or glancing impact at the rim of the pad, such as would be produced as the landing pad 20 slides along an abutment, will cause the pad to swing in the proper direction.

Dynamic investigations of the landing pads 20 have revealed that the friction between the pad and a simulated celestial surface is of direct influence on the stability of the space vehicle, and that the higher coefficients of friction require a wider spread of the landing gear system 14 than do lower coefficients. For example, although there is very little increase in the spread required if friction increases from $\mu=1$ to $\mu=\infty$ there is a noticeable reduction in the necessary spread required for stability if the friction is lowered from $\mu=1$ to $\mu=0.6$. Since a lowering or shortening of the spread of the landing gear system 14 will result in a substantial savings in weight, it is highly desirable that the coefficient of friction occurring between the landing pads 20 and the celestial surface 12 be maintained at certain values regardless of the type of surface encountered at touchdown.

This maintenance of a desired coefficient of friction has been accomplished by covering the underside of the landing pads 20 with a layer or coating 58 (FIGURE 3) that shears or wears away at certain friction forces. Various types and combinations of material can be used for obtaining this desired shearing or wearing away such as, for example, various layers of sheet aluminum that may be bonded together to form a laminated structure, each layer of which has a slightly higher shear level than the preceding one thereby assuring that each layer peels-off in a designated order. Preferably, however, the layer 58 takes the form of a coating that has a surface coefficient of friction of a predetermined value. Such a coating may have a gradient thereacross which gradually increases as the underside of the landing pad 20 is approached. This permits a gradual increase in the coefficient of friction from approximately $\mu=0.6$ to $\mu=0.8$ as the layer 58 wears away due to the sliding of the pad across the landing surface 12. By the use of such a layer 58, the coefficient of friction to be encountered by the landing pads 20 as they slide on the surface of a celestial body can be reasonably accurately ascertained regardless of whether the surface at the touch-down point is rock, rock frost, dust or a combination thereof.

From the foregoing it can be readily seen that this invention provides a landing pad arrangement for use with a space vehicle landing gear system which not only assures that the vehicle will receive sufficient support on a perfectly vertical touch-down landing on level terrain, but that should sliding of the vehicle occur the pads will not dig-in nor transmit undue shock to this system upon impact with a solid abutment. Furthermore, a predetermined coefficient of friction can always be maintained thus permitting a savings in weight within the landing gear system to be realized.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by the United States Letters Patent is:

1. A load bearing pad adapted for transporting and supporting a load over a surface comprising:
   (a) sheet means,
      (1) said sheet means being gradually curved to form a substantially bowl-shaped structure,
      (2) the outer face of said bowl-shaped structure having a convex shape adapted to engage with and slide over said surface;
   (b) pivot joint means including a ball and socket assembly mounted on said bowl-shaped structure for pivotably attaching said structure to a load, said socket being attached to the inner surface of said bowl-shaped structure to form a pivot point positioned within and near the bottom of said bowl-shaped structure at the point substantially opposite the apex of said convexly shaped outer face so that substantially all force components produced when said structure slides over said surface will pass through or above said pivot point thereby causing said structure to pivot about said pivot point into a positive angle of attack with said surface; and
   (c) rib means attached to and extending from said sheet means for strengthening said sheet means against collapsing in a direction parallel with the axis of said pad.

2. A load bearing pad according to claim 1 wherein said rib means are adapted to collapse when a force greater than a predetermined value is applied against the edge of said bowl-shaped structure thereby absorbing a portion of said force and preventing the shock applied to said socket from exceeding a predetermined amount.

3. A load bearing pad according to claim 2 wherein said rib means are poistioned at an angle between said socket and said inner surface of said bowl to facilitate the collapsing of said rib means when said predetermined force value is exceeded.

4. A load bearing pad according to claim 1 wherein said convexly shaped outer face of said sheet means is adapted to wear away at a predetemined rate when said bowl shaped structure is sliding over said surface thereby maintaining the coefficient of friction between said structure and said surface below a predetermined value.

5. A load bearing pad according to claim 4 wherein said convexly shaped outer face includes a coating having a predetermined surface coefficient of friction.

6. A load bearing pad according to claim 5 wherein said surface coefficient of friction is below $\mu=1$.

References Cited by the Examiner

UNITED STATES PATENTS

| 1,099,505 | 6/14 | Lewellin | 248—188.8 |
| 1,898,309 | 2/33 | Nolting | 248—188.9 |
| 2,753,586 | 7/56 | Metz | 16—18 |
| 2,927,747 | 3/60 | Bennie | 244—17.17 |

FOREIGN PATENTS 500,213    1/51    Belgium.

CLAUDE A. LE ROY, *Primary Examiner.*